United States Patent [19]
Rupp et al.

[11] Patent Number: 6,053,082
[45] Date of Patent: Apr. 25, 2000

[54] HOLDER FOR ORBITABLE TOOL

[75] Inventors: Gerhard Rupp, Aglasterhausen; Thorsten Frank, Karlsruhe, both of Germany

[73] Assignee: Widia GmbH, Essen, Germany

[21] Appl. No.: 09/276,358

[22] Filed: Mar. 25, 1999

[51] Int. Cl.[7] ..................................................... B23B 41/00
[52] U.S. Cl. .................. 82/1.2; 87/1.3; 87/1.4; 408/181
[58] Field of Search ................. 82/1.2, 1.3, 15, 82/1.4; 408/143, 153, 181

[56] References Cited

U.S. PATENT DOCUMENTS

| | | | |
|---|---|---|---|
| 3,710,659 | 1/1973 | Pagella . | |
| 4,637,285 | 1/1987 | Mizonguchi | 82/1.2 |
| 4,899,628 | 2/1990 | Seichter et al. | 82/1.4 |
| 5,012,710 | 5/1991 | D'Andrea et al. | 82/1.2 |
| 5,909,986 | 6/1999 | Kaiser | 408/181 |

FOREIGN PATENT DOCUMENTS

| | | |
|---|---|---|
| 1 193 768 | 12/1959 | Germany . |
| 35 26 712 | 1/1987 | Germany . |
| 41 37 364 | 5/1992 | Germany . |
| 43 30 822 | 3/1995 | Germany . |
| 197 17 172 | 6/1997 | Germany . |

*Primary Examiner*—Andrea L. Pitts
*Assistant Examiner*—Mark Williams
*Attorney, Agent, or Firm*—Herbert Dubno; Andrew Wilford

[57] ABSTRACT

A tool holder has a housing rotatable about a holder axis, a motor mounted on the housing and having an output rotatable about a motor axis transverse to the holder axis, and a rotation sensor mounted on the housing and coupled coaxially to the motor. A drive wheel mounted on the rotary motor output is rotatable by the motor about the motor axis and is connected to respective wheels of a pair of shafts each having a screwthread. The screwthreads are of opposite hand and respective nuts threaded on the shafts so that rotation of the motor output synchronously rotates the shafts and oppositely displaces the nuts. A tool-holding slide displaceable transversely of the axis on the plate is fixed to the nut of one of the shafts and a counterweight displaceable transversely of the axis on the plate is coupled to the nut of the other shaft. A controller inductively coupled to the motor and rotation sensor electrically powers the motor in accordance with the position of the motor output as detected by the sensor to oppositely synchronously displace the slide and counterweight.

8 Claims, 4 Drawing Sheets

HOLDER FOR ORBITABLE TOOL

FIELD OF THE INVENTION

The present invention relates to a holder for an orbitable tool. More particularly this invention concerns such a holder that can orbit a tool about an axis while in contact with a workpiece and that can also move the tool radially of the axis as it orbits.

BACKGROUND OF THE INVENTION

In various machining operations a tool, for instance a cutting bit, is held offset from an axis and is orbited about this axis as it engages and cuts or grinds a stationary workpiece. It is also common in some operations for the tool to be moved radially of the axis as it is orbited, for instance to plane the surface of the workpiece, cut a circular groove in the workpiece, cut a hole centered on the axis in the workpiece, or even turn an inside surface of a hollow workpiece.

To this end the holder normally has a main body that is rotated about the axis and that carries a slide displaceable diametrally of the axis and in turn provided with a seat that the tool is mounted in. A motor on the main body is capable of displacing the slide as needed by the machining operation, being connected through an appropriate linkage to the slide.

German 1,193,768 issued May 26, 1965 to Mottu describes a boring head in particular for a coordinate-type boring machine that has a bore-head housing with a holder for securing to the spindle and a slide movable radially of the spindle axis and adapted to hold a bit. In order to set the radial position of the slide there is a servo drive that is mounted in the boring head and that is digitally controlled via a sensor arrangement. The motor and the sensor of the servo drive are diametrally opposite one another in the bore-head housing.

Electricity is fed via commutator rings to the motor that shifts the slide in the bore head. The slide, which is guided on rollers, is displaced by a micrometer-type screw with each end of the screw carrying a gear forming part of a drive between the motor and the micrometer screw. The commutator rings are subject to fouling in use and can open-circuit the motor, in particular when the machining process uses cutting oil. In addition the gear-type drive does not accurately move the tool, and when the tool is moved relatively far out the center of mass of the bore head is offcenter, causing it to vibrate when rotated.

Thus U.S. Pat. No. 3,710,659 of Pagella describes an automatically controlled tool-holding device that is also adapted to be mounted on a rotating drive spindle. It has an electric drive motor that is fixed in the tool head and whose output shaft extends on the rotation axis of the device, making the unit fairly long. A worm gear on the output shaft engages with a helically threaded shaft that shifts the slide radially. Such a system also does not displace the slide highly accurately and creates an offcenter mass when the slide is shifted widely. Once again, the motor is supplied power through commutator rings subject to fouling.

In German 3,526,712 issued Jan. 29, 1987 a planing or outside turning system is shown having a transversely displaceable slide that holds the cutting tools. Once again a drive motor and a position detector are provided in the head and are connected through a complex commutator system with the control and power lines. The transversely aligned drive motor engages via a drive in a gear that meshes with a rack that itself moves the slide. The position detector is a glass rod and a housing mounted feeler which create an extremely sensitive and failure-prone assembly. Furthermore the device is difficult to install and is subject to frequent breakdowns.

German patent 5,330,822 issued Mar. 16, 1985 to Schneider describes a tool head with a base body, a tool shaft projecting axially from the base body and couplable with the machine drive spindle, and at least one transversely displaceable and axially projecting slide. A position-sensing system is provided in the rotary head. The base body holds and electrical servomotor whose generally cylindrical body extends perpendicular to the head rotation axis. Power is transmitted inductively to the motor and the position information is transmitted via infrared to the controller. As a result of the construction, only a very short radial stroke is possible for the slide.

German 197 17 172 issued Nov. 6, 1997 to Scheer has an axially centered motor whose output shaft extends forward and carries a gear that meshes with a rack on the slide. While the axial centering does keep the system fairly well centered on the axis to reduce vibration, it makes the device rather long and bulky.

The device of German 41 37 364 issued May 21, 1992 to Mukai has several motors rotatable about perpendicular axes for controlling a multispindle lathe. This system is fairly complex and not readily adaptable to a chuck or tool holder where the tool is moved radially of a rotating body carrying it.

OBJECTS OF THE INVENTION

It is therefore an object of the present invention to provide an improved tool holder.

Another object is the provision of such an improved tool holder which overcomes the above-given disadvantages, that is which can accurately displace the tool-holding slide while being relatively insensitive to adverse work conditions, e.g. being covered with cutting oil, and which is still fairly compact.

A further object is to provide such an arrangement where the position of the tool is accurately detected and transmitted back from the tool to the control system operating it.

SUMMARY OF THE INVENTION

A tool holder has according to the invention a housing rotatable about a holder axis, a motor mounted on the housing and having an output rotatable about a motor axis transverse to the holder axis, and a rotation sensor mounted on the housing and coupled coaxially to the motor. A drive wheel mounted on the rotary motor output is rotatable by the motor about the motor axis and is connected to respective wheels of a pair of shafts each having a screwthread. The screwthreads are of opposite hand and respective nuts threaded on the shafts so that rotation of the motor output synchronously rotates the shafts and oppositely displaces the nuts. A tool-holding slide displaceable transversely of the axis on the plate is fixed to the nut of one of the shafts and a counterweight displaceable transversely of the axis on the plate is coupled to the nut of the other shaft. A controller inductively coupled to the motor and rotation sensor electrically powers the motor in accordance with the position of the motor output as detected by the sensor to oppositely synchronously displace the slide and counterweight.

The inductive coupling allows the slide to be positioned with great precision and is not likely to be interrupted by adverse working conditions. The motor, which is a precise stepping-type servomotor, and the position detector which is coaxially connected to it and which measures the angular position of the motor output shaft, can operate very precisely. By mounting the motor transversely, the tool holder can be relatively short and compact while the wheels remain accessible so they can be serviced easily.

The shafts according to the invention are rotatable about respective axes lying in a plane parallel to the motor axis and perpendicular to the main axis. In addition a toothed belt interconnecting the wheels. The result is an extremely compact structure. Furthermore the housing includes a plate substantially perpendicular to the axis and having opposite axially directed faces. The motor and rotation sensor are mounted on one face of the plate and the spindles are mounted on the other face of the plate, normally via journal blocks. Thus everything is solidly interconnected but all the elements are readily accessible for servicing. Semicylindrical walls extending from the plate contain the elements of the tool holder and protect it while in use.

The nuts according to the invention are circulating-ball nuts. Such nuts convert rotation into axial thrust very efficiently and with little slip or loss.

The inductive coupling is effected via a stationary ring juxtaposed with the housing and through coils in the ring and housing for connecting the controller with the motor and rotation sensor.

The controller includes a microprocessor which is independently connected, that is via two separate circuits, to the motor and rotation sensor.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
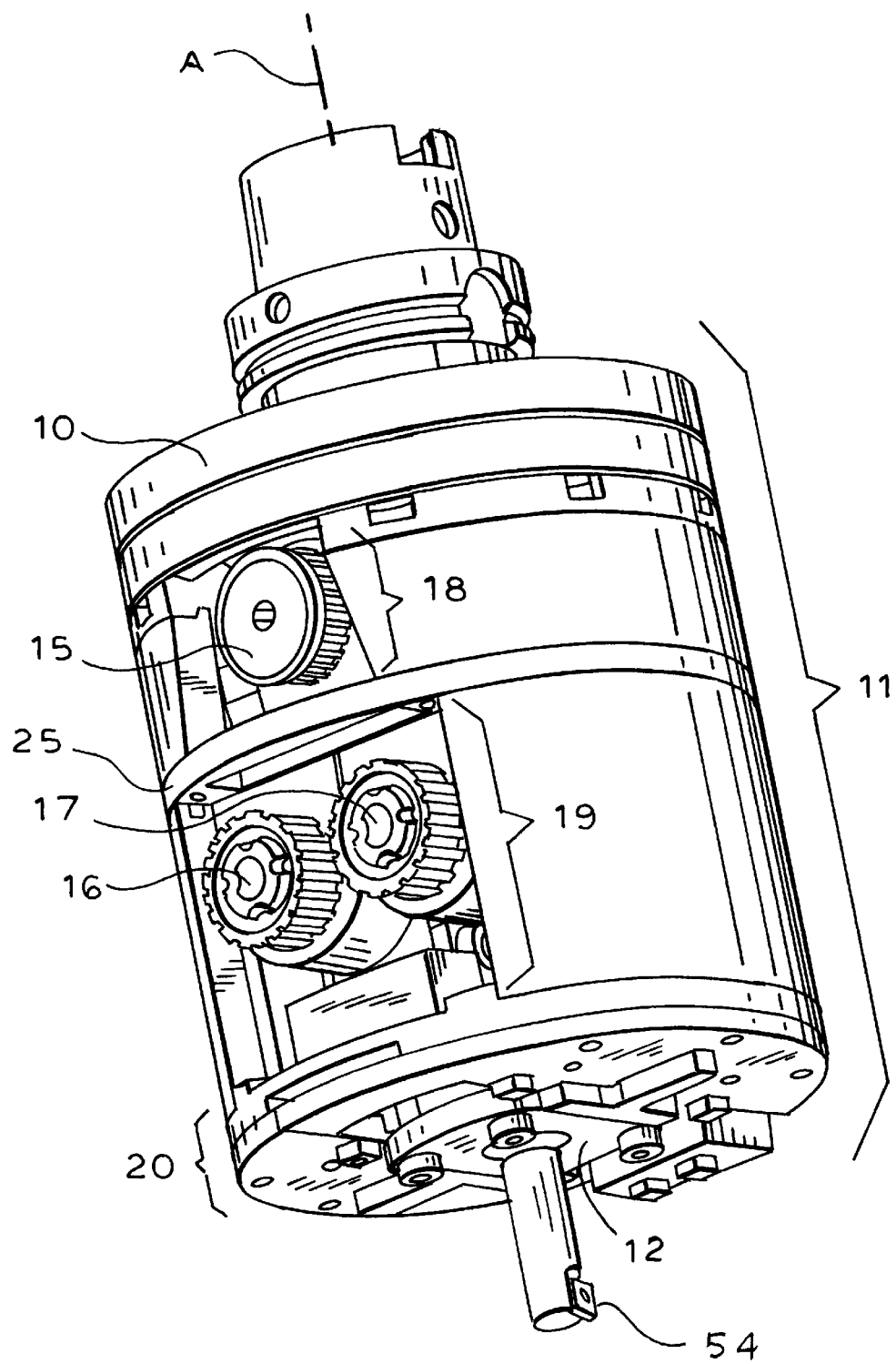
FIG. 1 is a perspective view of the tool holder according to the invention.
Figure 2:
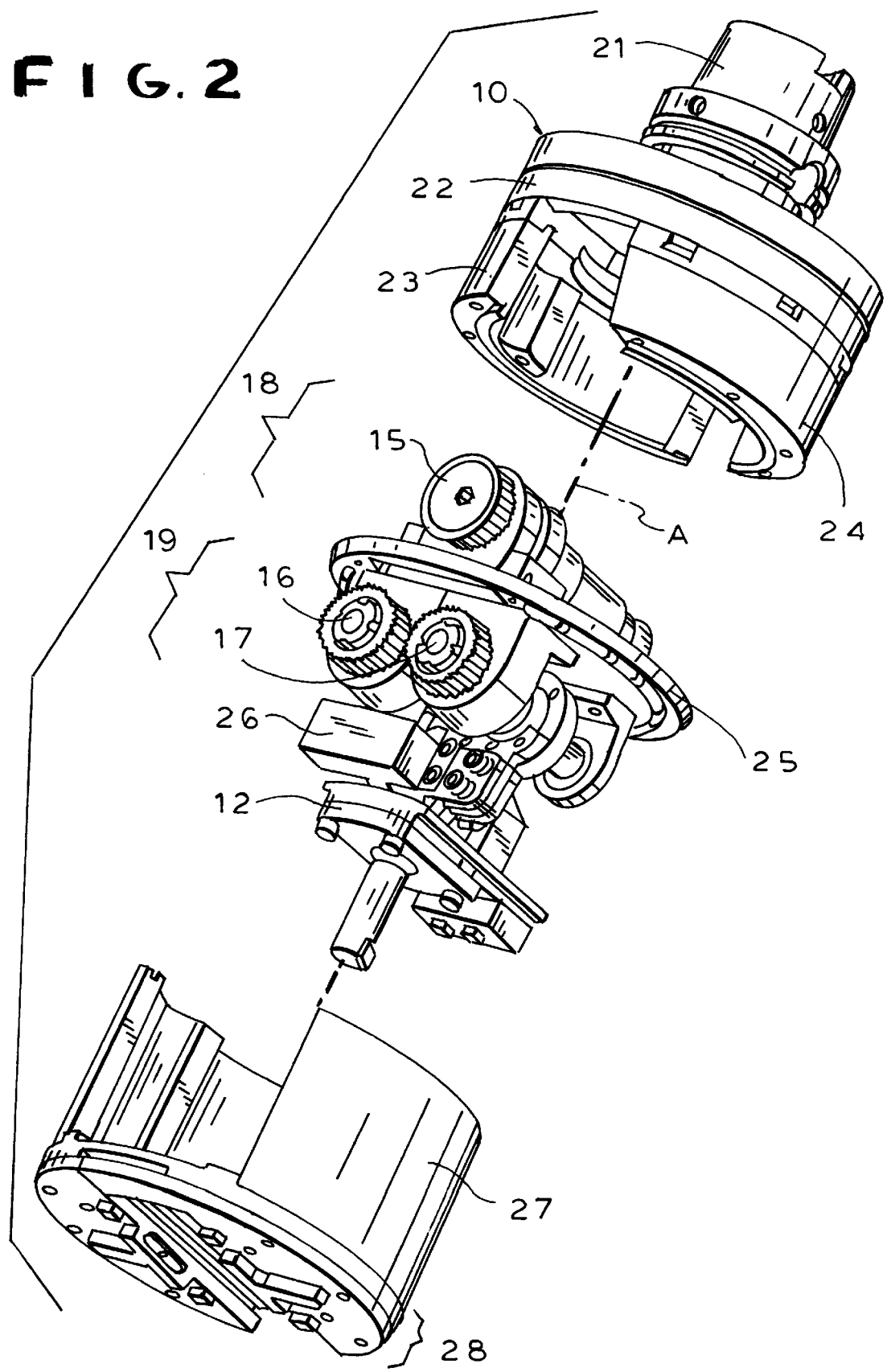
FIG. 2 is a perspective view showing the tool holder exploded axially into its three main subassemblies.
Figure 4:
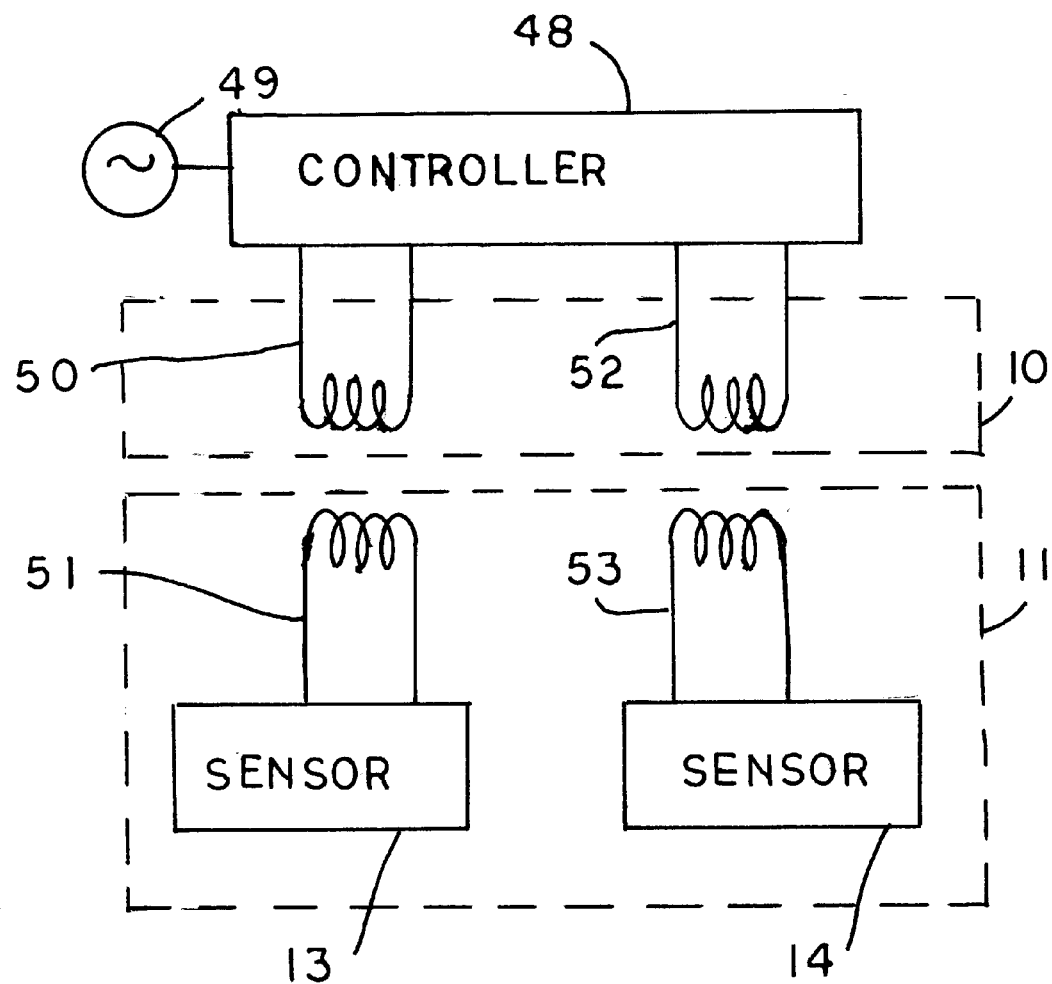
FIG. 4 is a schematic diagram illustrating an aspect of the tool holder.

As seen in FIG. 1 a tool holder basically comprises a stationary ring 10 centered on an axis A and an assembly 11 rotatable adjacent the ring 10 about the axis A and carrying on its axial front end a slide adapted to carry a tool 54. The stationary ring 10 is mounted via an unillustrated bearing on the rotating assembly 11 and carries as shown in FIG. 4 two coils 50 and 52 that are radially offset from each other and juxtaposed with similarly offset coils 51 and 53 carried on the assembly 11. The rotating assembly 11 holds a position sensor 13 having a feed coil 51 juxtaposed with the coil 50 and a motor 14 having a feed coil 53 juxtaposed with the coil 51. The coils 50 and 52 in the stationary ring 10 are connected to a combined controller 48 and power supply 49 for numeric control of the motor 14 in accordance with the position detected by the sensor 13. The connection between the controller 48 and power supply 49 to the coils 50 and 52 can be via a conventional plug and socket. The sensor 13 and motor 14 are coaxial so the sensor 13 detects the exact position of an output shaft 55 of the motor 14.

The motor 14 can incorporate planetary stepdown gearing and the output shaft 55 extends along a motor axis A' and carries a drive wheel 15 connected via a toothed belt 47 to a pair of gears 16 and 17 connected in turn as described below to the slide 12 and to a counterweight 26. The assembly 11 is subdivided at a central mounting plate 25 into a motor side holding the motor 14 and sensor 13, and a drive side 19 holding the linkage to the slide 12 which lies in an end zone 20 where it can move diametrally of the axis A.

More particularly an input shaft 21 fixed to the plate 22 is adapted to be connected to a drive spindle and the plate 22 carries two generally semicylindrical walls 23 and 24 that contain the sensor 13 and motor 14 and on whose axial outer ends the plate 25 is mounted. Two more such semicylindrical walls 27 connect the other side of the plate 25 to a stack of three end plates 28 that define a diametral guide slot for the slide 12 and for the counterweight 26.

Figure 3:
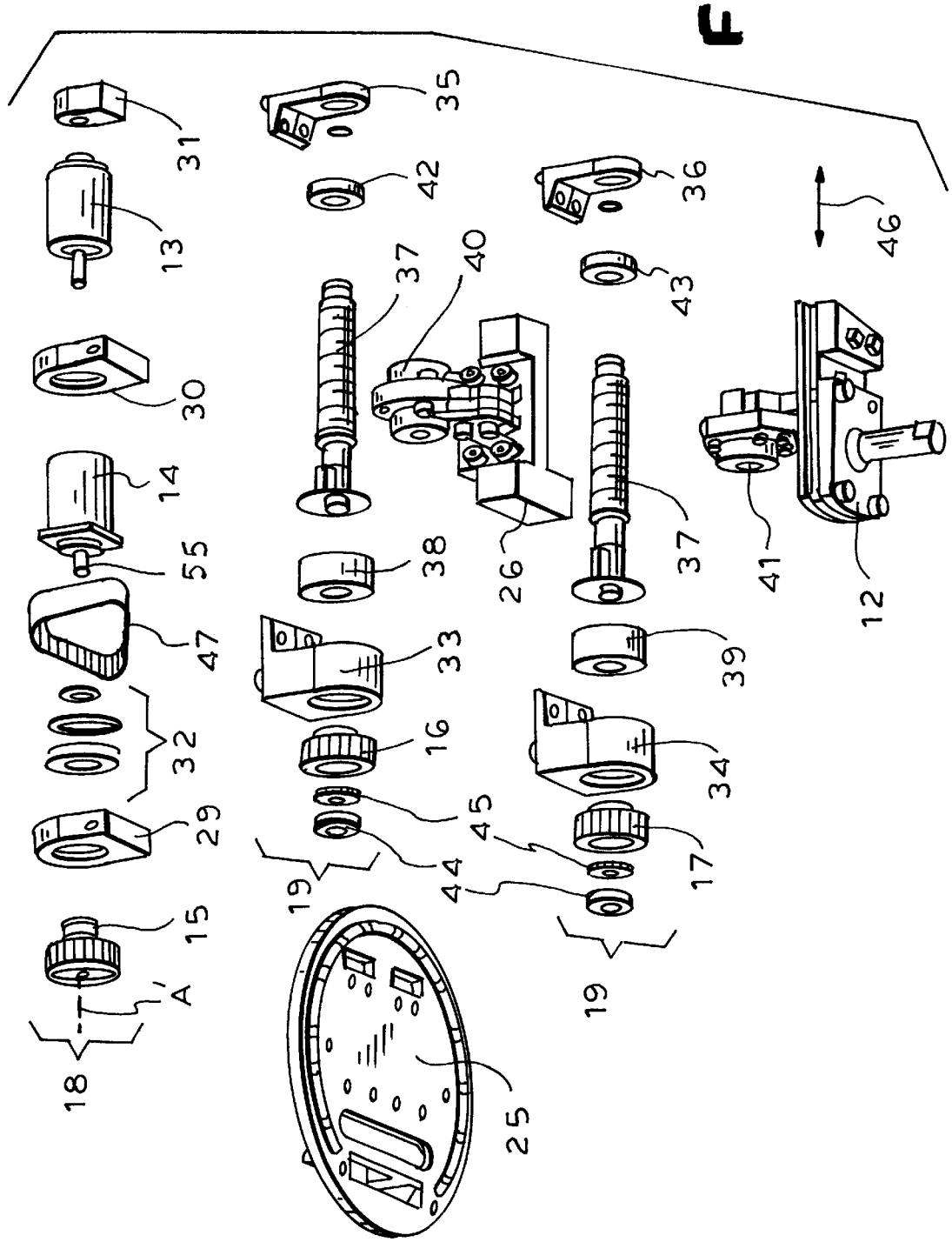
FIG. 3 is a wholly exploded view of the holder.

As better shown in FIG. 3 the sensor 13 and motor 14 are mounted on their side 18 of the plate 25 on three coaxial journal blocks 29, 30 and 31. Bearings 32 are provided that support the wheel 15 in the block 20 so that the motor shaft 55 need only be splined into the wheel 15 and all radial and axial forces are transmitted via the bearings 32 to the block 29 and thence to the plate 25, thereby avoiding any stress to the motor 14. On the other side of the plate 25 journal blocks 33, 34, 35, and 36 support a pair of shafts 37 that are substantially identical with external screwthreads of identical pitch but opposite hand and that are centered on parallel axes lying in a plane perpendicular to the axis A while symmetrically flanking this axis A. These shafts 37 are supported at their ends in bearings 38, 39, 42 and 43 and carry at their outer ends the wheels 16 and 17 that are coupled by the belt 47 to the wheel 15. Nuts 44 and lock washers 45 fix the wheels 16 and 17 on the ends of the shafts 37.

The shafts 37 are threaded into respective traveling ball nuts 40 and 41 respectively fixed to the counterweight 26 and slide 12. Thus rotation of the wheel 15 in one direction will rotate the two shafts 37 synchronously in the same direction and move the slide 12 and counterweight 26 radially toward each other and opposite rotation will move them radially apart as indicated by arrow 46. The masses of the slide 12 and counter-weight 26 are balanced and they are moved identically and synchronously so that at all time the center of mass of the device remains on the axis A.

We claim:

1. A tool holder comprising:

a housing rotatable about a holder axis;

a motor mounted on the housing and having an output rotatable about a motor axis transverse to the holder axis;

a rotation sensor mounted on the housing and coupled coaxially to the motor;

a drive wheel mounted on the rotary motor output and rotatable by the motor about the motor axis;

a pair of shafts each having a screwthread, the screwthreads being of opposite hand;

respective traveling nuts threaded on the shafts;

respective wheels on the shafts coupled to the drive wheel, whereby rotation of the motor output synchronously rotates the shafts and oppositely displaces the nuts;

a tool-holding slide displaceable transversely of the holder axis and fixed to the nut of one of the shafts;

a counterweight displaceable transversely of the holder axis and coupled to the nut of the other shaft; and control means inductively coupled to the motor and rotation sensor for electrically powering the motor in accordance with the position of the motor output as detected by the sensor and for thereby oppositely synchronously displacing the slide and counterweight.

2. The tool holder defined in claim 1 wherein the shafts are rotatable about respective axes lying in a plane parallel to the motor axis and perpendicular to the main axis.

3. The tool holder defined in claim 2, further comprising
a toothed belt interconnecting the wheels.

4. The tool holder defined in claim 1 wherein the housing includes a plate substantially perpendicular to the holder axis and having opposite axially directed faces, the motor and rotation sensor being mounted on one face of the plate and the spindles being mounted on the other face of the plate.

5. The tool holder defined in claim 1 wherein the nuts are circulating-ball nuts.

6. The tool holder defined in claim 1, further comprising
a stationary ring juxtaposed with the housing; and
inductive coupling means including coils in the ring and housing for interconnecting the control means and the motor and rotation sensor.

7. The tool holder defined in claim 1 wherein the control means includes a microprocessor.

8. The tool holder defined in claim 7 wherein the microprocessor is independently connected to the motor and rotation sensor.

* * * * *